Jan. 30, 1962

H. M. GILBERT, JR 3,018,996

WHEEL CHOCK HOLDER

Filed Aug. 12, 1958

Henry M. Gilbert, Jr.
INVENTOR.

BY
Attorneys

United States Patent Office 3,018,996
Patented Jan. 30, 1962

3,018,996
WHEEL CHOCK HOLDER
Henry M. Gilbert, Jr., 210 N. Pedro St.,
Los Angeles, Calif.
Filed Aug. 12, 1958, Ser. No. 754,592
2 Claims. (Cl. 248—316)

This invention relates to safety devices for trucks or other large vehicles and more particularly to a wheel chock and holder for the chock.

The object of the invention is to provide a safety device for a motor vehicle, particularly a truck, the safety device furnishing a durable wheel chock mounted adjacent to the wheel of a vehicle and retained by a holder that serves a dual function of not only holding the chock in the inoperative position but also as an anchor to prevent inadvertent separation of the chock from the vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
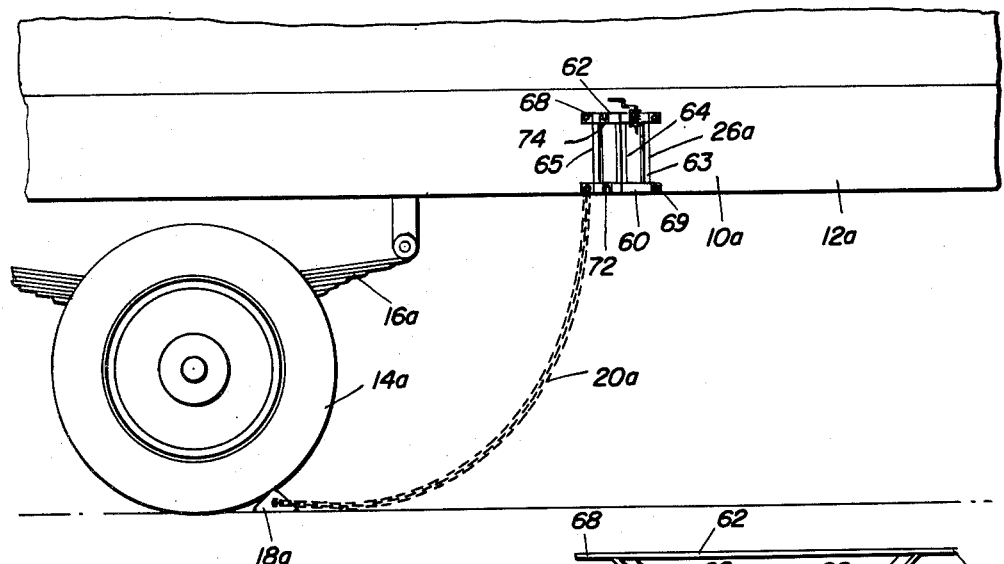
FIGURE 1 is a fragmentary side elevational view of a motor truck equipped with a wheel chock and a holder therefor embodying the present invention.
Figure 2:
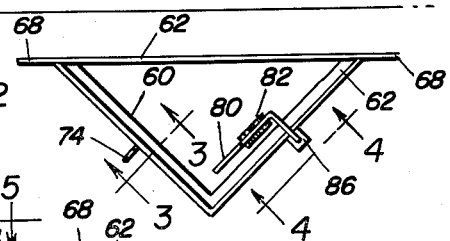
FIGURE 2 is a top view of the chock holder.
Figure 3:
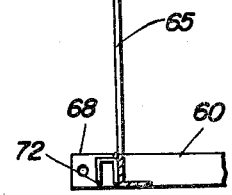
FIGURE 3 is a sectional view taken on the line 3—3 of FIGURE 2.

Referring to the drawing in detail, it will be seen that reference character 10a designates a portion of a vehicle comprising wheels 14a supported by spring assembly 16a, and the spring assembly is attached to the frame 12a of the vehicle.

Reference character 18a designates an elongated wheel chock of suitable material, preferably plastic, and of triangular transverse section. A chain 20a is attached at one end to wheel chock 18a and attached at its other end to a wheel chock holder 26a, the latter being rigidly secured to the frame 12a of the vehicle.

Holder 26a is made of a lower triangular frame 60 and an upper triangular frame 62 held spaced apart and parallel to each other by three parallel braces 63, 64 and 65, each of which is attached at its ends to the upper and lower frames, respectively. The braces are preferably made of angle iron with the two inner braces or frame members having flanges within which two of the corners of the chock 18a nest, while the apical brace 64 has flanges accommodating the apical part of the chock 18a. The frame members at the bottom of the holder can also be made of angle iron. There are rear transverse mounting plates 68 and 69 to which the ends of the angular upper and lower frames are secured, and these are preferably provided with apertures through which fasteners, for instance, bolts can be passed to bolt the holder 26a to the frame 12a. A pair of hooks 72 and 74 are attached to the upper and lower frame so that the chain 28 can be wrapped around the hooks when the wheel chock is not being used as a safety device for the vehicle. However, it is a very simple matter to unwind the chain and place the chock 18a in the operative position as shown in FIGURE 1.

Figure 4:
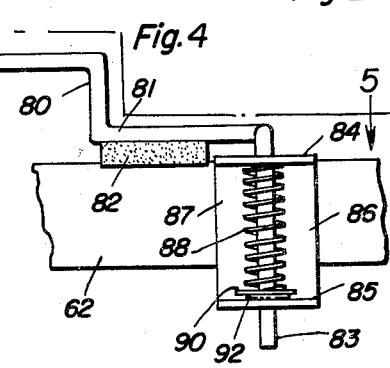
FIGURE 4 is an enlarged elevational detail view taken approximately on the line 4—4 of FIGURE 2 but with the chock clamp or retainer in an inoperative position.
Figure 5:
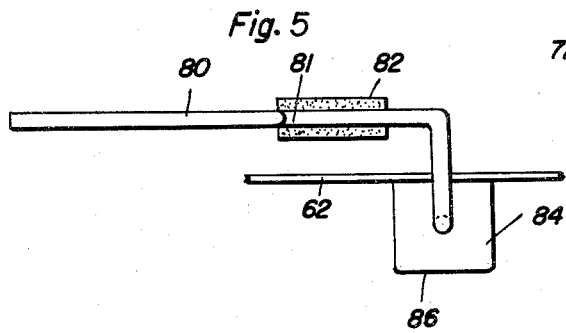
FIGURE 5 is an elevational detail view taken on the line 5—5 of FIGURE 4.

There are means for latching the wheel chock within holder 26a. These means are seen best in FIGURES 4 and 5 and consist of a horizontal arm or handle 80 having a downwardly offset laterally angulated intermediate portion 81 to which resilient pad 82 is adhered. The pad can be held in place by any standard technique, for instance, by cement, bolting, or may be in the form of a sleeve applied to the handle 80. The arm or handle 80 further comprises a downturned inner end portion or spindle 83 that passes through the parallel sides 84 and 85 of mounting bracket 86. The mounting bracket is U-shaped, thereby having an intermediate plate or bight portion 87 attached to the sides or legs 84 and 85, and this plate can be welded or otherwise secured to one of the sides of the upper frame 62. A spring 88 is concentrically disposed on the spindle 83 with the upper end of the spring seated against side 84 of bracket 86 and the lower end of the spring seated on a washer 90 on said spindle 83 between sides 84 and 85. A pin 92 is passed through an opening in shank 83 and is seated on the inner surface of side 85. This pin is also a reaction member for spring 88.

In use of the latch, handle 80 is lifted and swung clear of the holder 26a. The chock 18a, ordinarily resting on the inwardly directed flanges of the lower angle iron sides of lower frame 62, can then be lifted out and used. The lifting of handle 80 is yieldingly opposed by spring 88. When the chock 18a is returned to the holder 26a, the handle 80 is again lifted and swung thereover. The handle 80 is then released and the spring 88 engages the pad 82 under pressure with said chock for retaining same in the holder 26a in an obvious manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A holder for an elongated vehicle wheel chock of generally triangular cross section, said holder comprising a vertically elongated metallic receptacle triangular in plan and open at its top for the reception of the chock, means for securing the receptacle on a vehicle, a generally U-shaped bracket mounted horizontally on the upper portion of the receptacle and having its bight portion affixed thereto, the legs of said bracket having vertically aligned openings therein, and means on the bracket for releasably securing the chock in the receptacle, said means including a horizontal arm comprising a downwardly offset, laterally angulated intermediate portion terminating in a downturned end portion slidably and rotatably engaged in the openings, a resilient pad on said angulated intermediate portion engageable on the upper end of the chock in the receptacle, and a coil spring in the bracket encircling said downturned end portion and operatively connected thereto for yieldingly urging same downwardly for engaging the pad with the chock.

2. A holder for an elongated vehicle wheel chock of generally triangular cross section, said holder comprising a vertically elongated metallic receptacle triangular in plan and open at its top for receiving the chock, said receptacle including horizontal upper and lower, generally triangular frames comprising means for attachment to a vehicle, said lower frame further comprising angle bars including horizontal flanges for receiving thereon and supporting the chock, said receptacle further including vertical angle bars extending between the corner portions of the frames for slidably receiving the longitudinal corner portions of the chock, and means for releasably securing the chock in the receptacle, the last named means comprising a generally U-shaped bracket mounted horizontally on the upper frame and having its bight portion affixed thereto, the legs of said bracket having vertically aligned openings therein, a horizontal arm comprising a downwardly offset, laterally angulated intermediate portion terminating in a downturned end portion slidably and rotatably engaged in the openings, a resilient pad on said angulated intermediate portion engageable on the upper end of the chock in the receptacle, and a coil spring in the bracket encircling said downturned end portion and operatively connected thereto for yieldingly urging same downwardly for engaging the pad with the chock.

References Cited in the file of this patent

UNITED STATES PATENTS

| | | |
|---|---|---|
| 476,065 | Pomroy | May 31, 1892 |
| 963,361 | Dietz | July 5, 1910 |
| 1,621,176 | Sonin | Mar. 15, 1927 |
| 2,424,004 | Terrell | July 15, 1947 |
| 2,508,662 | Carper | May 23, 1950 |
| 2,789,665 | Wright | Apr. 23, 1957 |
| 2,797,774 | Eckhart | July 2, 1957 |

FOREIGN PATENTS

| | | |
|---|---|---|
| 119,603 | Great Britain | Oct. 10, 1918 |